(12) United States Patent
Rysgaard

(10) Patent No.: US 9,883,515 B2
(45) Date of Patent: Jan. 30, 2018

(54) COMMUNICATION DEVICE AND METHOD FOR RECEIVING INFORMATION

(71) Applicant: Bent Henneberg Rysgaard, Aalborg Oest (DK)

(72) Inventor: Bent Henneberg Rysgaard, Aalborg Oest (DK)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 452 days.

(21) Appl. No.: 13/743,380

(22) Filed: Jan. 17, 2013

(65) Prior Publication Data

US 2014/0198732 A1 Jul. 17, 2014

(51) Int. Cl.
*H04W 72/08* (2009.01)
*H04W 48/12* (2009.01)
*H04W 76/04* (2009.01)
*H04W 60/00* (2009.01)
*H04W 68/12* (2009.01)
*H04W 88/06* (2009.01)

(52) U.S. Cl.
CPC ......... *H04W 72/082* (2013.01); *H04W 48/12* (2013.01); *H04W 60/005* (2013.01); *H04W 68/12* (2013.01); *H04W 76/048* (2013.01); *H04W 88/06* (2013.01)

(58) Field of Classification Search
CPC .......... H04W 4/20–4/206; H04W 8/18–8/183; H04W 24/04; H04W 68/005–68/025; H04W 68/12; H04W 88/06; H04W 88/182
See application file for complete search history.

(56) References Cited

U.S. PATENT DOCUMENTS

2008/0207230 A1* 8/2008 Jung et al. .................... 455/458
2009/0213809 A1 8/2009 Kwon et al.
2013/0303203 A1* 11/2013 Wang et al. .................. 455/458

FOREIGN PATENT DOCUMENTS

DE 102004038358 A1 2/2006
DE 602005000434 T2 5/2007
EP 1613006 B1 1/2007

OTHER PUBLICATIONS

OA received for DE patent application No. DE102014100418.3, dated Oct. 6, 2014, 8 pages of office action and 5 pages of English translation.

* cited by examiner

*Primary Examiner* — Eric Myers
(74) *Attorney, Agent, or Firm* — Viering, Jentschura & Partner mbB

(57) ABSTRACT

A communication device is described including a transceiver configured to establish a communication channel via a first radio cell and receive idle mode information of a second radio cell via the communication channel.

22 Claims, 4 Drawing Sheets

COMMUNICATION DEVICE AND METHOD FOR RECEIVING INFORMATION

TECHNICAL FIELD

The present disclosure relates to communication devices and methods for receiving information.

BACKGROUND

When operating a communication device, the case may occur that the reception of two sets of information, which should both be received by the mobile communication device, has a conflict, e.g. due to the collision of the transmission timing of the two sets of information. For example, a communication device including two SIMs (Subscriber Identity Modules) which are in service in parallel may need to receive paging information or system information from one base station for one of the SIMs while having a dedicated connection to another base station for the other of the SIMs. Efficient reception of both sets of information is desirable.

SUMMARY

A communication device is provided including a transceiver configured to establish a communication channel via a first radio cell and receive idle mode information of a second radio cell via the communication channel.

Further, a method for receiving information according to the communication device described above is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects in which the invention may be practiced. These aspects are described in sufficient detail to enable those skilled in the art to practice the invention. Other aspects may be utilized and structural, logical, and electrical changes may be made without departing from the scope of the invention. The various aspects are not necessarily mutually exclusive, as some aspects can be combined with one or more other aspects to form new aspects.

Figure 1:
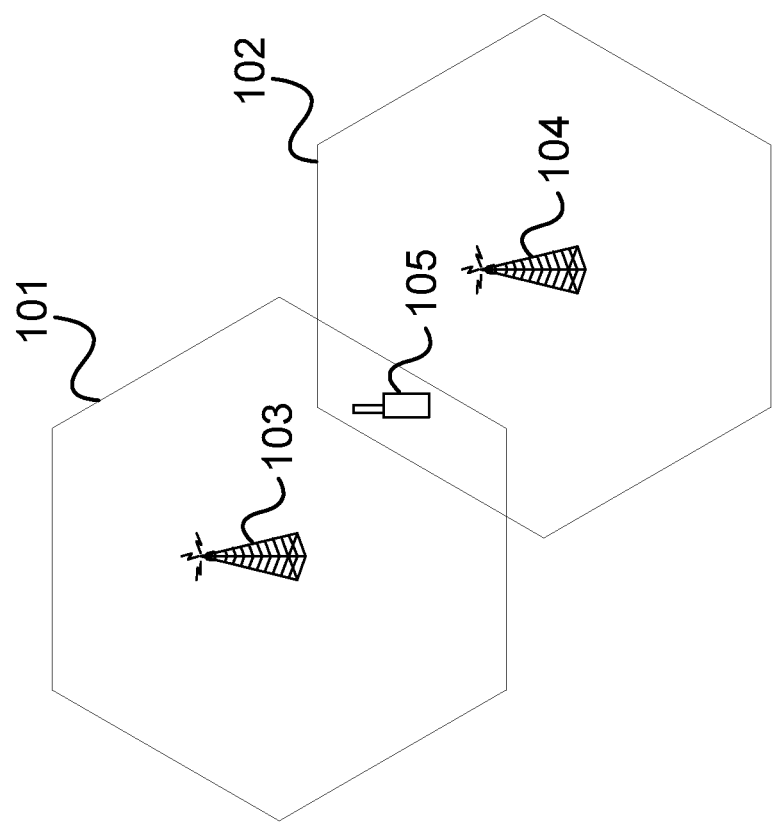
FIG. 1 shows a communication arrangement.

FIG. 1 shows a communication arrangement 100.

The communication arrangement 100 includes a first radio cell 101 and a second radio cell 102. The first radio cell 101 is operated by a first base station 103 and the second radio cell 102 is operated by a second base station 104. The first base station 103 is for example part of a radio access network of a first mobile communication network and the second base station 104 is for example part of a radio access network of a second mobile communication network. It is assumed that the first mobile communication network and the second communication network are different mobile communication networks, e.g. are operated by different operators and/or require separate subscriptions. It should however be noted that the following may also be applied to the first mobile communication network and the second communication network are the same mobile communication network.

The first mobile communication network and the second mobile communication network each may for example be a GSM (Global System for Mobile Communications) communication system, a UMTS (Universal Mobile Telecommunications System), a CDMA2000 (CDMA: Code Division Multiple Access) communication system, an LTE (Long Term Evolution) communication system or a FOMA (Freedom of Mobile Access) communication system.

The first radio cell 101 and the second radio cell 102 are assumed to overlap such that a mobile terminal 105 located in the overlap area of the first radio cell 101 and the second radio cell 102 can receive signals from both the first base station 103 and the second base station 104 and can use both the first communication network and the second communication network for communication.

For being able to use both the first communication systems and the second communication system, the mobile terminal 105 may include two (or more) subscriber identity modules, e.g. SIMs or USIMs (Universal Subscriber Identity Modules). In other words, the mobile terminal 105 may be a multi-SIM device supporting communication via two (or more) different mobile communication networks.

The mobile terminal 105 may be only able to receive data from either the first base station 103 or the second base station 104 at a time. For example, the mobile terminal 105 may be only able to tune to a communication channel of either the first base station 103 or the second base station 104 at a time and/or may be only able to tune to either the frequency range used by the first base station 103 for operating the first radio cell 101 or the frequency range used by the second base station 104 for operating the second radio cell 102.

The mobile terminal 105 may for example include a first SIM for using the first communication network and a second SIM for using the second communication network. The mobile terminal 105 may be able to still monitor for calls incoming via the second communication network while in a call or data transfer via the first communication network. For this, the mobile terminals may include transmission gaps in the call and/or data connection and switch its RF receiver to the second radio cell 102 to monitor for incoming calls.

The mobile terminal 105 may for example create a transmission gap for only some or all idle mode procedures to be carried out for the second communication network (such as paging). For example, the mobile terminal 105 may only create transmission gaps for listening to paging messages or may also create gaps for receiving system information, monitoring neighbor radio cells, doing reselections, etc.

For the call or data transfer it would typically be desirable that the number of transmission gaps is reduced. For example, just listening for paging messages of the second communication network with worst case network setup may reduce the maximum data transfer rate of a (e.g. TCP) data connection via the first communication network by as much as 32%. This does not even take into account that the TCP (Transmission Control Protocol) connection could further worsen this number e.g. due to overhead.

So, trying to maintain a full idle mode (e.g. including all idle mode procedures such as paging and radio cell reselection) on the second communication network, while the mobile terminal 105 has an active data connection via the first communication network is a trade-off between how good and long that idle mode can be maintained versus the maximum data rate of the data connection.

It should further be noted that some idle mode procedures require longer transmission gaps than others. An example is synchronization to a neighboring radio cell which for example requires listening for up to 11 TDMA frames in GSM per neighbor radio cell. Creating such long transmission gaps in a data transfer via a data connection may have a highly negative effect on the data throughput of the data connection. For example, synchronizing to GSM neighbor radio cells may create a transmission gap of 60 ms for each neighbor radio cell. Accordingly, creating a lot of transmission gaps in a data transfer or call to maintain service on the second SIM may not be desirable since the impact on the quality of the connection for the first SIM may simply be too high.

In the following, a communication device is described which may for example allow reducing the impact on a data transfer via a data connection in case that the communication device is a multi-SIM terminal or reduce power usage in a single-SIM terminal by reading, for example, system information, frequency information (e.g. frequency offset information) or synchronization information via a data channel (e.g. a data channel present in a multi-SIM scenario or a channel used for a data burst for an application running on the terminal, e.g. in case that a high number of applications are running on a (e.g. open platform) single SIM terminal) e.g. from the Internet. For example, frequency information or synchronization information for a radio cell is read from the Internet before a frequency burst (FB) or a synchronization burst (SB) (whatever is needed for synchronization) of that radio cell is decoded.

Figure 2:
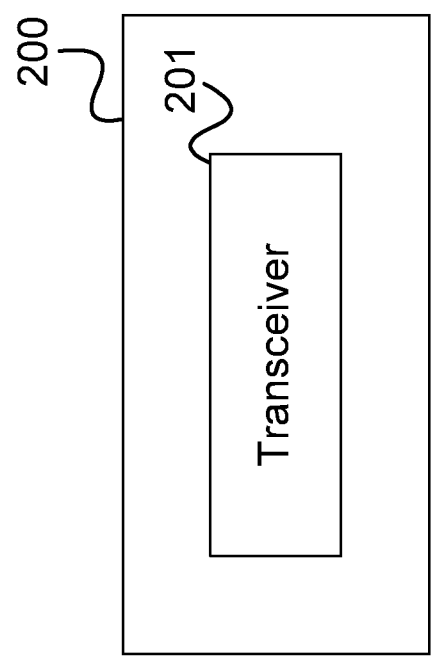
FIG. 2 shows a communication device.

FIG. 2 shows a communication device 200.

The communication device 200 includes a transceiver 201 configured to establish a communication channel via a first radio cell and receive idle mode information of a second radio cell via the communication channel.

In other words, a communication device receives information that is transmitted to terminals in idle mode in a cell via a communication channel (e.g. a dedicated communication channel, e.g. for data transmission) of another cell. The communication channel is for example be used for data transmission to the communication device in context of the first radio cell and can thus be seen as a data connection.

Idle mode information of a radio cell can be understood as information that is received by a mobile communication terminal in the radio cell and/or transmitted to one or more mobile communication terminals in the radio cell when the mobile communication terminal is in idle mode.

It should be noted that the communication device 200 may have one or more further transceivers, e.g. to support dual-channel data.

Idle mode (e.g. RRC (Radio Resource Control) idle mode) can be understood as a mode of the communication device in which it has no layer 3 (e.g. RRC) communication connection (e.g. layer 3 channel) to a radio communication network.

Connected mode (e.g. RRC connected mode) can be understood as a mode of the communication device in which it has a layer 3 (e.g. RRC) communication connection (e.g. layer 3 channel) to a radio communication network.

Alternatively, idle mode can be understood as a mode of the communication device in which it has no point-to-point connection to another communication device and connected mode can be understood as a mode of the communication device in which it has a point-to-point communication connection to another communication device.

It should be noted that the term "layer" may be understood to refer to the corresponding communication layer (i.e. the layer with the same number) of the OSI (Open System Interconnection) reference model.

It should further be noted that in case that the communication device has more than one SIM, e.g. two SIMs, it may be in idle mode for one of the SIMs (i.e. not having a dedicated layer 3 connection to the radio communication network associated with the SIM) while it may be in connected mode for the other SIM (i.e. having a dedicated layer 3 connection to the radio communication network associated with the other SIM).

The components of the communication device (such as the transceiver) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

The communication channel is for example a physical (i.e. layer 1) channel.

The communication channel is for example dedicated channel for the communication device.

The transceiver is for example configured to establish a (e.g. first) communication connection by means of the communication channel and to receive useful data via the communication connection.

The transceiver is for example configured to establish the communication channel with a base station operating the first radio cell.

The transceiver may be configured to establish a (e.g. second) communication connection by means of the communication channel and to receive the idle mode information via the communication connection.

The communication connections may be transport layer connections.

The (second) communication connection is for example a communication connection to a server computer and the transceiver is for example configured to receive the idle mode information from the server computer.

The transceiver may be further configured to request the idle mode information via the communication channel, e.g. via the second communication connection, for example from the server.

The communication device is for example a mobile communication terminal (e.g. a cell phone).

The communication device is for example a subscriber terminal.

For example, the first radio cell is a radio cell of a first radio communication network and the second radio cell is a radio cell of a second radio communication network.

The communication device is for example a subscriber terminal of the first radio communication network and a subscriber terminal of the second radio communication network.

For example, the communication device includes a first subscriber identity module identifying the communication device as a subscriber of the first radio communication network and a second subscriber identity module identifying the communication device as a subscriber of the second radio communication network.

The first radio cell and the second radio cell may also be radio cells of the same radio communication network.

The communication device is for example a subscriber terminal of the radio communication network.

The idle mode information for the second radio cell is for example control information.

The idle mode information includes for example (only) information of up to layer 3.

The idle mode information is for example paging information of the second radio cell, system information of the second radio cell, synchronization information of the second radio cell or radio cell broadcast information of the second radio cell.

Figure 3:
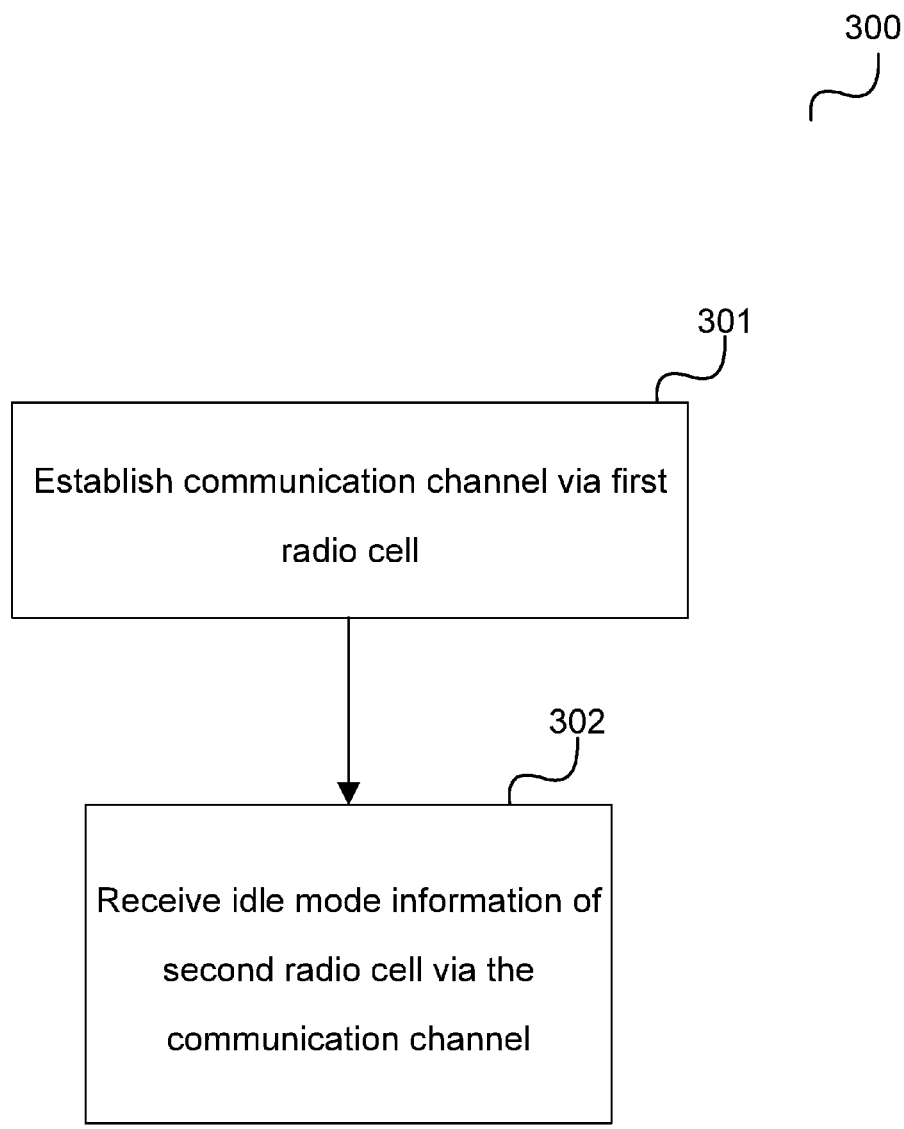
FIG. 3 shows a flow diagram.

The communication device 200 for example carries out a method as illustrated in FIG. 3.

FIG. 3 shows a flow diagram 300.

The flow diagram 300 illustrates a method for receiving information.

In 301, a communication device establishes a communication channel via a first radio cell.

In 302, a communication device receives idle mode information of a second radio cell via the communication channel.

It should be noted that aspects described in context of the communication device 200 are analogously valid for the method illustrated in FIG. 3 and vice versa.

In the following, an example is described in more detail.

Figure 4:
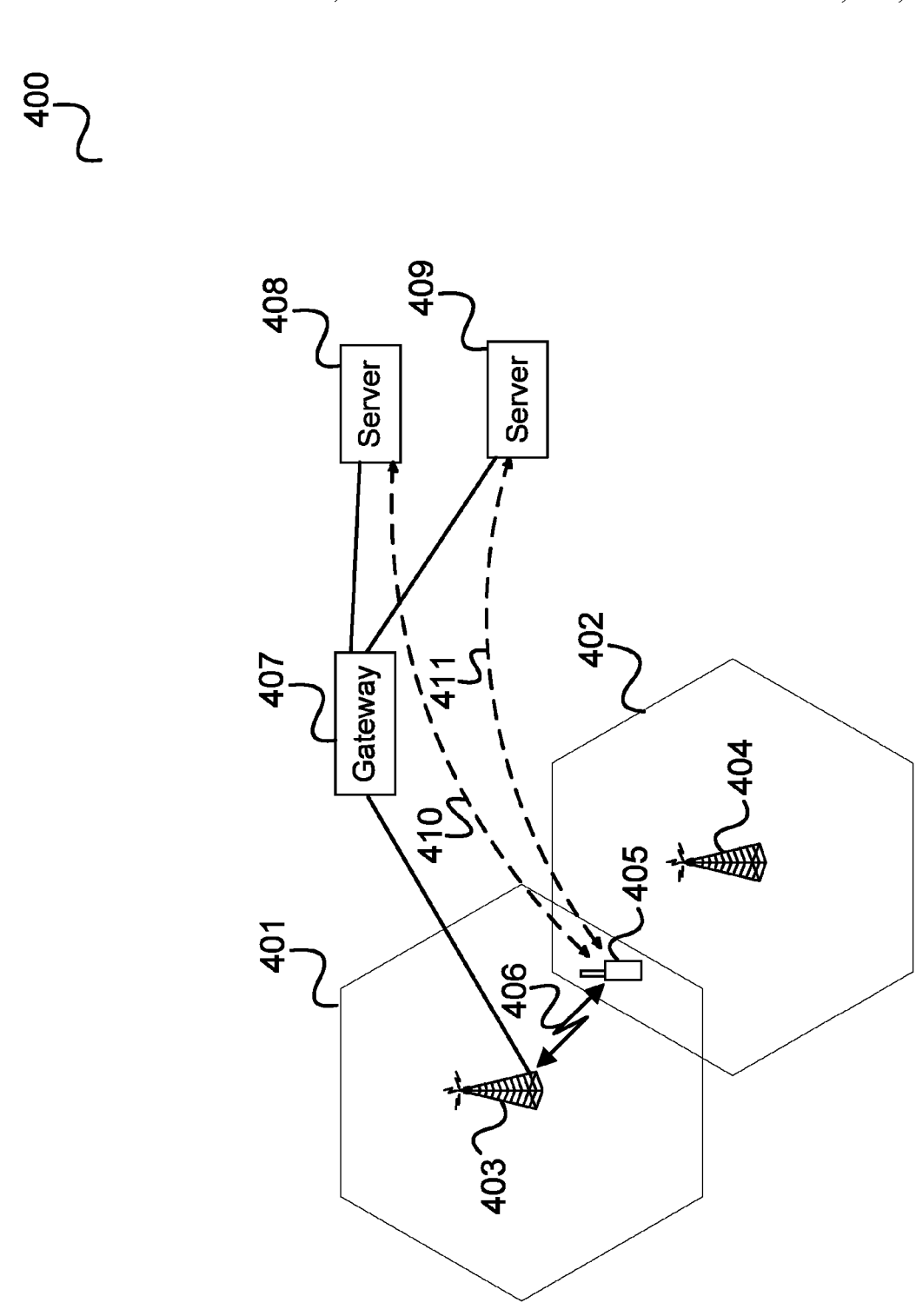
FIG. 4 shows a communication arrangement illustrating an example in which a communication device downloads idle mode information from a server.

FIG. 4 shows a communication arrangement 400.

The communication arrangement 400 includes a first radio cell 401 operated by a first base station 403 and a second radio cell 402 operated by a second base station 404. The first radio cell 401 and the second radio cell 402 for example correspond to the radio cells 101, 102.

A communication device 405, e.g. a mobile communication terminal, is located in a region of overlap of the first radio cell 401 and the second radio cell 402. The communication device 405 has a dedicated physical radio communication channel 406 to the first base station 403. The first base station 403 is connected to a gateway 407 (e.g. a serving gateway and/or a packed data network gateway) via which the first base station 403 may connect to a first server 408 and a second server 409 (e.g. implemented by one or more server computers).

The gateway 407 is for example part of the core network of the mobile communication network to which the first base station 403 belongs. Each server 408, 409 may also be part of the core network or may be part of another network, e.g. the Internet.

Via the communication channel 406 and the gateway 407 the communication device 405 has a first communication connection 410 to the first server 408 and a second communication connection 411 to the second server 409.

The first communication connection 410 and the second communication connection 411 are for example for example layer 4 (e.g. TCP) connections. For example, the first communication connection 410 is a communication connection for downloading data (i.e. for a data transfer) from the first server 408. The first communication connection 410 can thus be seen as a (layer 4) data connection. Alternatively, the first communication connection 410 may be a call and for example be a communication connection to another communication device located in a further radio cell.

Via the second communication connection 411, the communication device 405 is provided with idle mode information for the second radio cell 402 from the second server 409.

For example system information of the second radio cell 402 is provided to the communication device 405 via the second communication connection 411. System information may include any system information as for example includes in the system information blocks (SIBs) according to 3GPP, for example a neighboring cell list, jump tables, channel configuration information etc.

Reading system information broadcast in the second radio cell 402 is a low volume activity which can be performed from anywhere in the second radio cell 402. By making the system information of the second radio cell 402 available via the second communication connection 410 and the communication channel 406, it is no longer necessary to create transmission gaps in the data transfer via the communication channel 406, e.g. the data transfer via the first communication connection 408 to read all system information and the communication channel 406 may be utilized much more efficiently since no loss of data throughput is caused by transmission gaps.

Reading system information is reading some 16 radio blocks of 21 bytes in GSM and similarly in UMTS, etc.

As an example assume that the communication device 405 is a multi-SIM terminal with a first SIM associated with the first radio cell 401 and a second SIM associated with the second radio cell 402 and has only one RF receiver and baseband receiver and that the communication channel 406 provides a 7.2 mbps downlink data channel according to UMTS (which may for example utilized for the first communication connection 410) for the first SIM. Further, it is for example assumed that data would be transferred via the communication channel 406 for the entire duration of reading system information on GSM of the second radio cell 402. For example, the communication device 405 is a DSDS (Dual SIM Dual Standby) enabled terminal In this case, reading all system information would potentially create 16 gaps of, for example, 30 ms each. In that case, the loss in data rate of the communication channel 406 would be at least (16*30/2000)*100%=24% during the time system information is read. Due to TCP/IP and the acknowledged protocols of 3 GPP the loss in data rate can be expected to be much higher in practical application.

However, transmitting the system information via the communication channel 406 itself would, on a 7.2 mbps channel, last less than 1 ms even considering a 100% protocol overhead compared to 16*18 ms according to GSM.

So, by reading the system information for the second radio cell 402 using the second server 409 (e.g. an Internet server) requires less than 1% of the time than the time that would be needed to create transmission gaps in the data transfer via the communication channel 406 (and e.g., the data transfer via the first communication connection 410).

Considering that a mobile terminal 405 may need to read system information not only for a serving cell, but also for a number of neighbor cells, reading system information using the channel 406 may be a huge improvement of the data throughput of the channel 406 in view of the number of transmission gaps needed to read the broadcast system information from the cells themselves.

The communication device 405 may be configured to determine whether system information (or generally idle information) is available over the Internet and, if yes, where the information is located. The Internet address (i.e. the IP address) of the second server 409 may for example be stored on the SIM card associated with the second radio cell 402 which at the same time may indicate whether the communication network to which the second radio cell 402 belongs supports reading system information via the Internet.

In case the operator of the communication network wants the information to be protected, 21 byte information blocks may for example be protected by the A5x algorithms according to 3GPP.

In the above example, the first radio cell 401 and the second radio cell 402 belong to different radio communication networks and the communication device 405 has a first SIM associated with the first radio cell (i.e. a first SIM for using the radio communication network to which the first radio cell 401 belongs) and a second SIM associated with the second radio cell (i.e. a second SIM for using the radio communication network to which the second radio cell 401 belongs). However, transmission of system information (or generally idle mode information) for the second radio cell 402 via the communication channel 406 may also increase efficiency in case that the first radio cell 401 and the second radio cell 402 belong to the same communication network. For example, in case that the communication device 405 is "always on", i.e. it has a lot of data traffic (for example a communication device 405 may be active up to 30% of the time only from using Facebook) power may be saved because the communication device 405 may save a lot of system wake-ups if the data bursts via the communication channel 406 (e.g. used for transmitting Facebook information) are used to read system information of the second radio cell 402.

Another example of idle mode information of the second radio cell 402 that may be read via the communication channel 405 is information for synchronizing to the second radio cell 402.

Synchronizing to a network, in this case the second radio cell 402 mainly includes synchronizing to the frequency and the timing of the second radio cell. In case that both frequency and timing of the second radio cell are known to a certain degree, the transmission gap in the communication channel 405 required to get a true synchronization to the second radio cell can be significantly reduced.

As an example, the synchronization in GSM is a two step approach, first reading a frequency burst (FB) giving the frequency offset to the second radio cell 402 and the timing of the first time slot (time slot 0) in the second radio cell and then the synchronization burst (SB) giving the training sequence, frame number and timing reference to the second radio cell 402 with quarter bit accuracy.

By looking up this information (at least partially, e.g. a major part of this information) on the Internet, i.e. being provided with this information by the second server 409, the communication device is able to synchronize potentially only with the SB to gain true synchronization with the second radio cell 402. In case that the communication device 405 has a more advanced receiver it may potentially skip the SB altogether and directly receive a "normal" data burst, a paging or a system information burst. Reading an SB only requires 3 GSM time slots. If a data transfer on UMTS via the communication channel 405 is interrupted for only less than 2 ms the normal 10 ms frame structure would not be affected under good radio conditions. Only HSPA (High Speed Packet Access) which uses 2 ms frame structures would be affected.

In a single SIM open platform terminals a data connection is typically open in up to ⅓ of the time. In such a case the communication terminal 405 may receive synchronization information via the channel 406. This causes little overhead and saves using the receiver for 50 ms searching for the FB and the SB which leads to a power saving.

It should be noted that idle mode information for the second radio cell 402 does not necessarily need to be provided by a server via a (e.g. TCP/IP) connection as illustrated in FIG. 2 but may also be provided by a network component of the radio communication network such as the base station 403 to the communication device 405.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A multi-SIM communication device comprising:
   a transceiver configured to
      establish a communication channel to a first radio cell; wherein the first radio cell is connected to a gateway, and wherein the gateway is connected to a first server computer and connected to a second server computer;
      establish a first communication connection to the first server computer via the gateway;
      establish a second communication connection to the second server computer via the gateway where the second server computer transmits idle information of a second cell;
      receive idle mode information of the second radio cell from the second server computer via the second communication connection; and
   two or more subscriber identity modules (SIMs); wherein a first SIM is in idle mode; and wherein a second SIM is in a connected mode for the first SIM.

2. The communication device according to claim 1, wherein the communication channel is a physical channel.

3. The communication device according to claim 1, wherein the communication channel is a dedicated channel for the communication device.

4. The communication device according to claim 1, wherein the transceiver is configured to receive useful data via the first communication connection and/or the second communication connection.

5. The communication device according to claim 1, wherein the transceiver is configured to establish the communication channel with a base station operating the first radio cell.

6. The communication device according to claim 1, wherein the transceiver is configured to establish a communication connection by means of the communication channel and to receive the idle mode information via the first communication connection and/or second communication connection.

7. The communication device according to claim 6, wherein the first communication connection and/or second communication connection is a transport layer connection.

8. The communication device according to claim 6, wherein the first communication connection and/or second communication connection is a communication connection to a server computer and the transceiver is configured to receive the idle mode information from the server computer.

9. The communication device according to claim 1, wherein the transceiver is further configured to request the idle mode information via the communication channel.

10. The communication device according to claim 1, wherein the communication device is a mobile communication terminal.

11. The communication device according to claim 1, wherein the communication device is a subscriber terminal.

12. The communication device according to claim 1, wherein the first radio cell is a radio cell of a first radio communication network and the second radio cell is a radio cell of a second radio communication network.

13. The communication device according to claim 12, wherein the communication device is a subscriber terminal of the first radio communication network and a subscriber terminal of the second radio communication network.

14. The communication device according to claim 12, wherein the communication device comprises a first subscriber identity module identifying the communication device as a subscriber of the first radio communication network and a second subscriber identity module identifying the communication device as a subscriber of the second radio communication network.

15. The communication device according to claim 1, wherein the first radio cell and the second radio cell are radio cells of the same radio communication network.

16. The communication device according to claim 15, wherein the communication device is a subscriber terminal of the radio communication network.

17. The communication device according to claim 1, wherein the idle mode information for the second radio cell is control information.

18. The communication device according to claim 1, wherein the idle mode information comprises information of up to layer 3.

19. The communication device according to claim 1, wherein the idle mode information is paging information of the second radio cell, system information of the second radio cell, synchronization information of the second radio cell or radio cell broadcast information of the second radio cell.

20. A method for receiving information comprising:
establishing a communication channel from a communicated device having two or more subscriber identity modules (SIMs) to a first radio cell;
wherein the first radio cell is connected to a gateway, and wherein the gateway is connected to a first server computer and connected to a second server computer;
wherein a first SIM is in idle mode, and wherein a second SIM is in a connected mode for the first SIM;
establishing a first communication connection to the first server computer via the gateway;
establishing a second communication connection to the second server computer via the gateway;
receiving idle mode information of a second radio cell from the second server computer via the second communication connection.

21. The method according to claim 20, wherein the communication channel is a physical channel.

22. The method according to claim 20, carried out by a communication device wherein the communication channel is a dedicated channel for the communication device.

* * * * *